Figure 1:
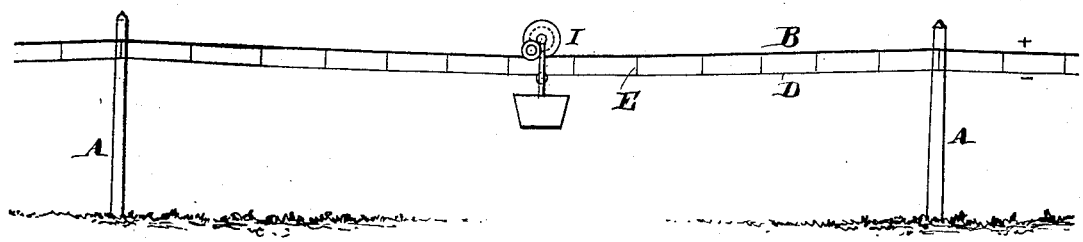

No. 651,343. T. P. CHANDLER. Patented June 12, 1900.
ELECTRIC RAILWAY.
(Application filed Mar. 10, 1900.)

(No Model.)

Attest
R. M. Kelly
D. W. Hoff———

Inventor
Theophilus P. Chandler

UNITED STATES PATENT OFFICE.

THEOPHILUS PARSONS CHANDLER, OF PHILADELPHIA, PENNSYLVANIA.

ELECTRIC RAILWAY.

SPECIFICATION forming part of Letters Patent No. 651,343, dated June 12, 1900.

Application filed March 10, 1900. Serial No. 8,118. (No model.)

*To all whom it may concern:*

Be it known that I, THEOPHILUS PARSONS CHANDLER, of the city and county of Philadelphia, in the State of Pennsylvania, have invented an Improvement in Electric Railways, of which the following is a specification.

My invention has reference to electric railways; and it consists of certain improvements, which are fully set forth in the following specification and shown in the accompanying drawings, which form a part thereof.

The object of my invention is to provide a suitable construction of supply-conductors whereby the positive and negative conductors may be suspended from supports at great distance apart, and yet maintained at equal distances apart throughout their length, and thereby secure a proper maintenance of electric contact with the collectors or trolleys.

My invention is equally applicable to those systems in which the car or cage is suspended from one of the conductors and where the weight of the vehicle or car is sustained upon the ground or upon a railway built upon the ground and the suspended conductors alone used as working lines to supply electricity to the car or vehicle.

In carrying out my invention I suspend a strong cable or wire upon suitable supports separated at great distances apart, and from this cable or wire I suspend a lighter cable or wire by means of suitable hangers or ties. The two cables or wires are insulated from each other, and one supplies current of one polarity and the other current of the opposite polarity. The positive and negative collectors run or move in contact with the respective cables or wires and by suitable conductors supply the electricity so collected to the motor or motors upon the moving vehicle. By suspending the lighter conductor from the heavy conductor or cable in this manner it is possible to hold it parallel thereto and in proper lateral alinement, so that the collectors may be approximately maintained at a fixed distance apart and yet maintain electric contact at all times. To insure the lower conductor-cable hanging properly below the supporting-cable, I provide the upper ends of the suspension connectors or ties with a jaw of such shape that while it forms a firm hold upon the cable it may always permit the cable to twist or turn without disturbing the vertical alinement of the suspension or tie rods. This simplifies the putting up of the cables and obviates the difficulties which would frequently arise where the ties were fixed tightly to the cable from which they hung.

My invention is furthermore readily adapted to existing cable-lines where trolleys are employed to convey heavy burdens under the action of gravity. By simply applying my improved light insulated conductor to the heavy trolley-cable the load may be taken down by gravity and the trolley returned under the application of electric power.

My invention will be better understood by reference to the accompanying drawings, in which—

Figures 2, 3, 4:
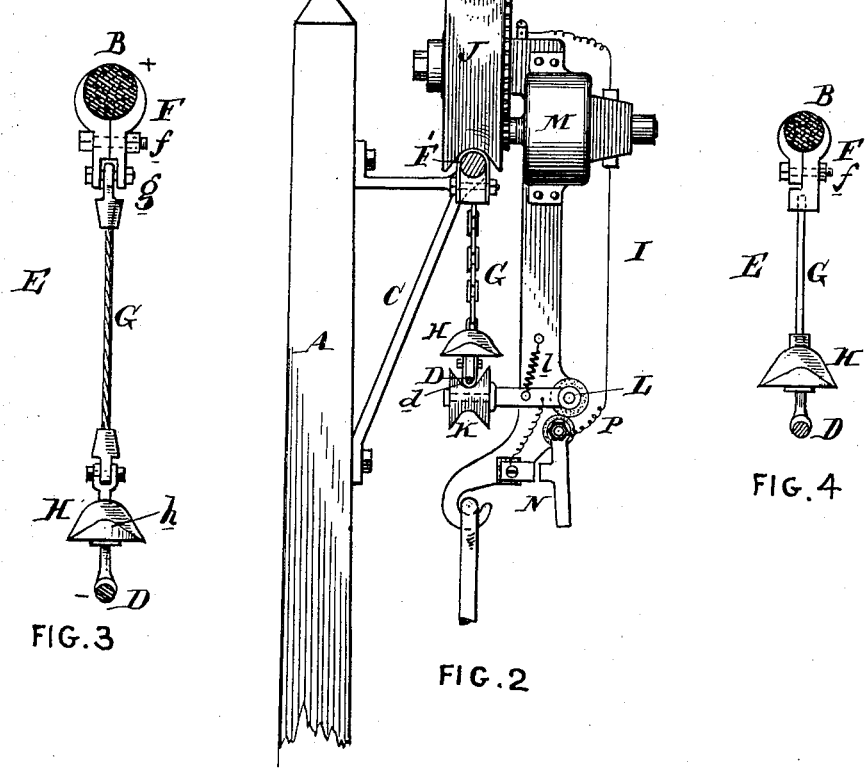
Figure 5:
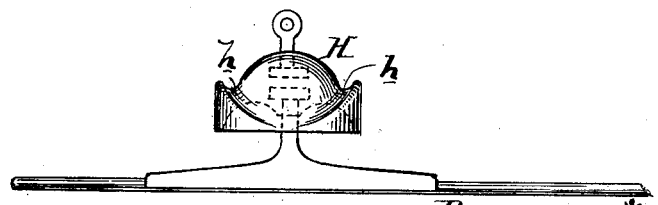

Figure 1 is an elevation of an electric railway embodying my invention. Fig. 2 is a cross-section of same. Figs. 3 and 4 are cross-sections of modified forms of the means of attachment of the several parts together, and Fig. 5 is an elevation of one of the insulators for the lower cable or conductor.

A are posts or means of support located in practice at great distances apart. Under some conditions these supports are one-half mile apart—as, for instance, where the cables are stretched down the sides of mountains or steep hillsides.

B is the main cable or that which carries the greatest weight.

D is the collector-cable and is suspended from the cable B at intervals in its length by the ties E, which are of uniform length. By this construction it is evident that the two cables B and D will be parallel to each other and in the same vertical plane. They will always maintain this parallelism irrespective of any swinging or vibration of the main cable. This construction also obviates any difficult labor in suspending the cable D, since all parts may be made in the shop and simply bolted in place in erecting the work. By having the two cables parallel it is easy to maintain electrical contact of the two collector-wheels, and this simplifies the general construction of the collector as a whole.

In Fig. 3 the heavy cable B is built up of wire strands and has attached to it the suspension or tie cables G. These may be leaded in sockets $g$, which are loosely bolted in the clamp F. The clamp F is formed of two parts having the upwardly-curved clamping-jaws, which when placed together and fastened by bolt $f$ constitute a clamp which extends around the bottom and sides of the cable B to somewhat above its center, as shown. The jaw F thus formed leaves the upper part of the cable exposed, so as to form no obstruction to the trolley-wheel and is free to rotate upon the cable B, so as to permit the cable to twist under strain without disturbing the perpendicular alinement of the suspension cables E. The lower ends of the cables G are connected with the insulators H, which are of the umbrella type, but preferably with the drain-grooves $h\ h$, to cause the water in rainstorms to run off to one side and reduce the liability of short-circuiting the line. If desired, the insulator may be of the ordinary bonnet type and arranged in any position on the suspension cable or wire. It is also evident that both insulators indicated in Fig. 4 may be used on the same construction as a double precaution against short-circuiting. In this figure the tie or suspension cables E are shown as of a light rod or wire and directly fastened at the bottom to the insulator H and at the top to the clamp F, which is hung upon the main or working cable A.

The main cable B is supported upon the posts A by suitable brackets C, while the conductor or electric cable D has no necessity for a direct connection with the posts A. Of course it is evident that it may be also attached to the posts, if so desired; but as it is suspended from the main cable A at short intervals such additional suspension would be needless. By this construction the posts A may be a very great distance apart, as the heavy cable B will be sufficiently strong to sustain not only its own weight and load, but the weight of the cable D also. In Figs. 1 and 2 I have shown a trolley I, having the grooved supporting-wheel J, running upon the cable B, and a flexibly-supported collector-wheel K, running against the under side of the cable or wire D. M is an electric motor geared to the main wheel J to propel the trolley. The wheel J supplies current of one polarity to one terminal of the motor and the wheel K supplies current of the opposite polarity to the other terminal of the motor. The collector-wheel is spring-pressed against the conductor D by a spring $i$, acting upon a hinged arm L, to which the wheel K is journaled. A switch-lever N may be automatically operated to close the motor-circuit when a level or upgrade is reached and opened when a downgrade is to be traveled over.

While I have shown in Figs. 3 and 4 the suspension-cable E as having the tie part G formed, respectively, of a cable and a rod, in Fig. 2 I have shown this part as made of a chain, and I therefore do not limit myself to either of these modifications. I would also point out that for light service the jaws F may be modified and made as straps extending completely over the cable B, as shown in Fig. 2. It is also evident that the conductor cable or wire D may be supported by a similar strap $d$; but I prefer in practice that the attachment shall be such as to prevent longitudinal shifting or creeping upon the conductor.

While I have shown the trolley as adapted to sustain the load, it is to be understood that I do not limit myself thereto, as the trolley structure proper may be simply used as a collector for an electrically-propelled vehicle running upon the surface in any of the well-known ways. In cases where the distance apart of the supporting-posts A is not great, the cable B may be made smaller, and where cables only act as conductors and to support a smaller trolley as a collector they may be made quite light and, if desired, both formed of single wires. It is to be understood that in the use of my invention for light work, as in mail or store service, the sizes of the conductors or cables and the distance apart may be much smaller than where heavy loads are to be carried. In some cases the electrically-propelled trolley or carriage is to be adapted for carrying passengers as well as freight.

While I prefer the construction shown, I do not limit myself to the details thereof, as they may be modified without departing from the spirit of the invention.

Having now described my invention, what I claim as new, and desire to secure by Letters Patent, is—

1. The combination of a relatively-heavy electric conductor or cable suspended at long intervals by supports, with a light conductor arranged parallel to the heavy conductor or cable and connecting flexible suspension devices for supporting the light conductor directly from the heavy conductor at short intervals and loosely attached to the heavy conductor whereby it may rotate, and insulators fixedly attached to the light conductor and jointed to the flexible suspension devices.

2. The combination of the heavy upper conductor, the lower parallel lighter conductor, and a series of insulated flexible connections between the two cables arranged at intervals in its length, said connections consisting of an upper clamping-jaw formed of two parts bolted together and having upwardly-directed and inwardly-curved tapered ends extending part way over the upper conductor so as to expose its upper part and turn thereon, a flexible support depending from said clamps and an insulated connection with the lower conductor.

3. The combination of a relatively-heavy electric conductor or cable suspended at long intervals by supports, with a light conductor arranged parallel to the heavy conductor or cable, and connecting insulating suspension devices for supporting the light conductor directly from the heavy conductor at short intervals, consisting of a short length of tie in the form of a cable, rod, chain or their equivalent, having at the top a detachable clamp adapted to grasp the heavy conductor but with freedom for rotation thereon, and at the bottom means for attachment to the light conductor.

4. The combination of an upper conductor supported at long intervals from the ground, a lower parallel cable, and a series of connecting insulating devices between the two conductors at close intervals for holding the lower cable parallel to the upper cable, each consisting of a jaw loosely attached to the upper conductor with freedom of rotation thereon, and a depending portion having means for insulating the lower conductor from the upper conductor.

5. The combination of the upper conductor, a lower conductor and a series of suspension devices of uniform length each consisting of a flexible part G, a loose clamping-jaw connecting with the upper conductor and free to rotate thereon, and an insulator connection between the flexible part G and the lower conductor.

In testimony of which invention I have hereunto set my hand.

THEOPHILUS PARSONS CHANDLER.

Witnesses:
R. M. HUNTER,
R. M. KELLY.